United States Patent [19]

Gamez et al.

[11] Patent Number: 5,258,943
[45] Date of Patent: Nov. 2, 1993

[54] APPARATUS AND METHOD FOR ROUNDING OPERANDS

[75] Inventors: Carlos Gamez, Mountain View; Roland Pang, San Jose, both of Calif.

[73] Assignee: Intel Corporation, Santa Clara, Calif.

[21] Appl. No.: 814,361

[22] Filed: Dec. 23, 1991

[51] Int. Cl.$^5$ .............................................. G06F 7/38
[52] U.S. Cl. ..................................... 364/745; 364/748
[58] Field of Search ........................... 364/745, 748

[56] References Cited

U.S. PATENT DOCUMENTS

| | | | |
|---|---|---|---|
| 4,796,217 | 1/1989 | Takahashi et al. | 364/745 |
| 4,839,846 | 6/1989 | Hirose et al. | 364/745 |
| 4,926,370 | 5/1990 | Brown et al. | 364/745 |
| 4,977,535 | 12/1990 | Birger | 364/745 |
| 5,122,981 | 6/1992 | Taniguchi | 364/745 |
| 5,128,889 | 7/1992 | Nakano | 364/745 |

Primary Examiner—David H. Malzahn
Attorney, Agent, or Firm—Blakely, Sokoloff, Taylor & Zafman

[57] ABSTRACT

A microprocessor which includes means for rounding a 68 bit binary number. The rounding bit is calculated based on the precision, rounding mode, and the Guard, Round, and Sticky bits. One path assumes that the number will not be rounded up and pads zeros to the fraction bits according to the precision. Another path assumes that the number will be rounded up. Ones instead of zeros are padded, again, according to the precision. Then, the padded number is incremented by one. Based on the rounding bit, either the non-rounded up path or the rounded up path will be chosen. Thereby, a correctly rounded number with the trailing bits following the least significant bit of the selected precision being zeros results.

17 Claims, 6 Drawing Sheets

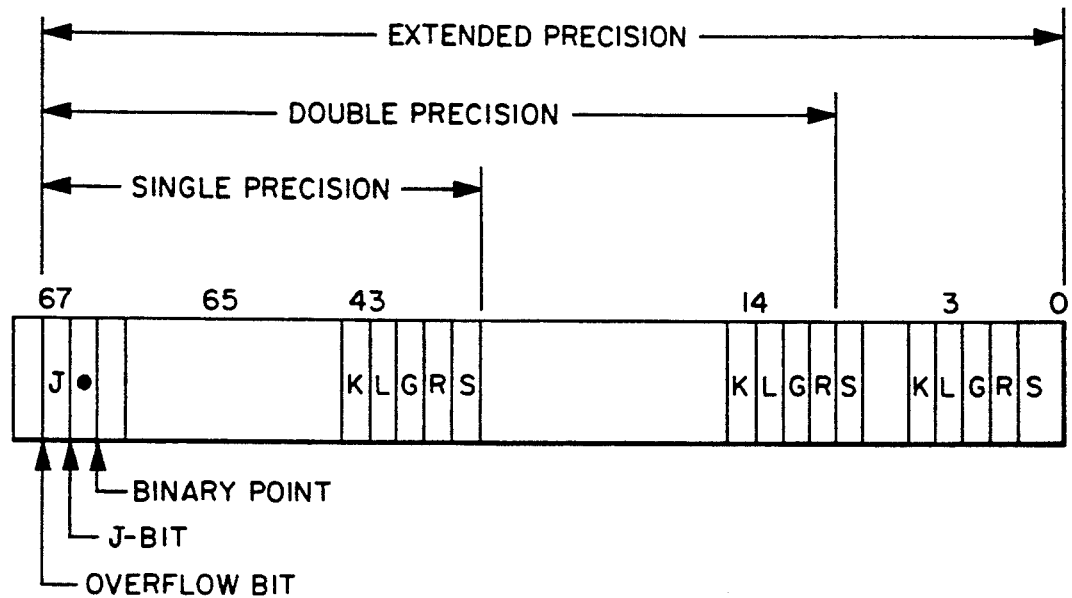
FIG_1
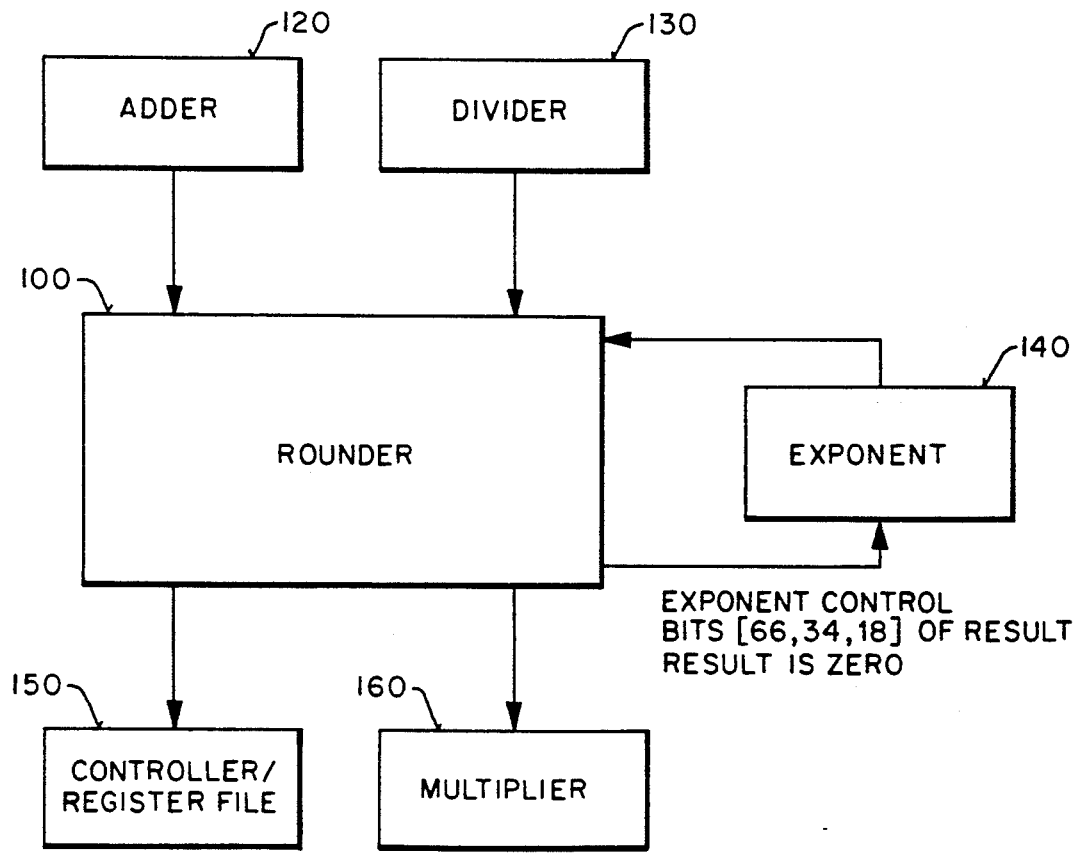
FIG_2

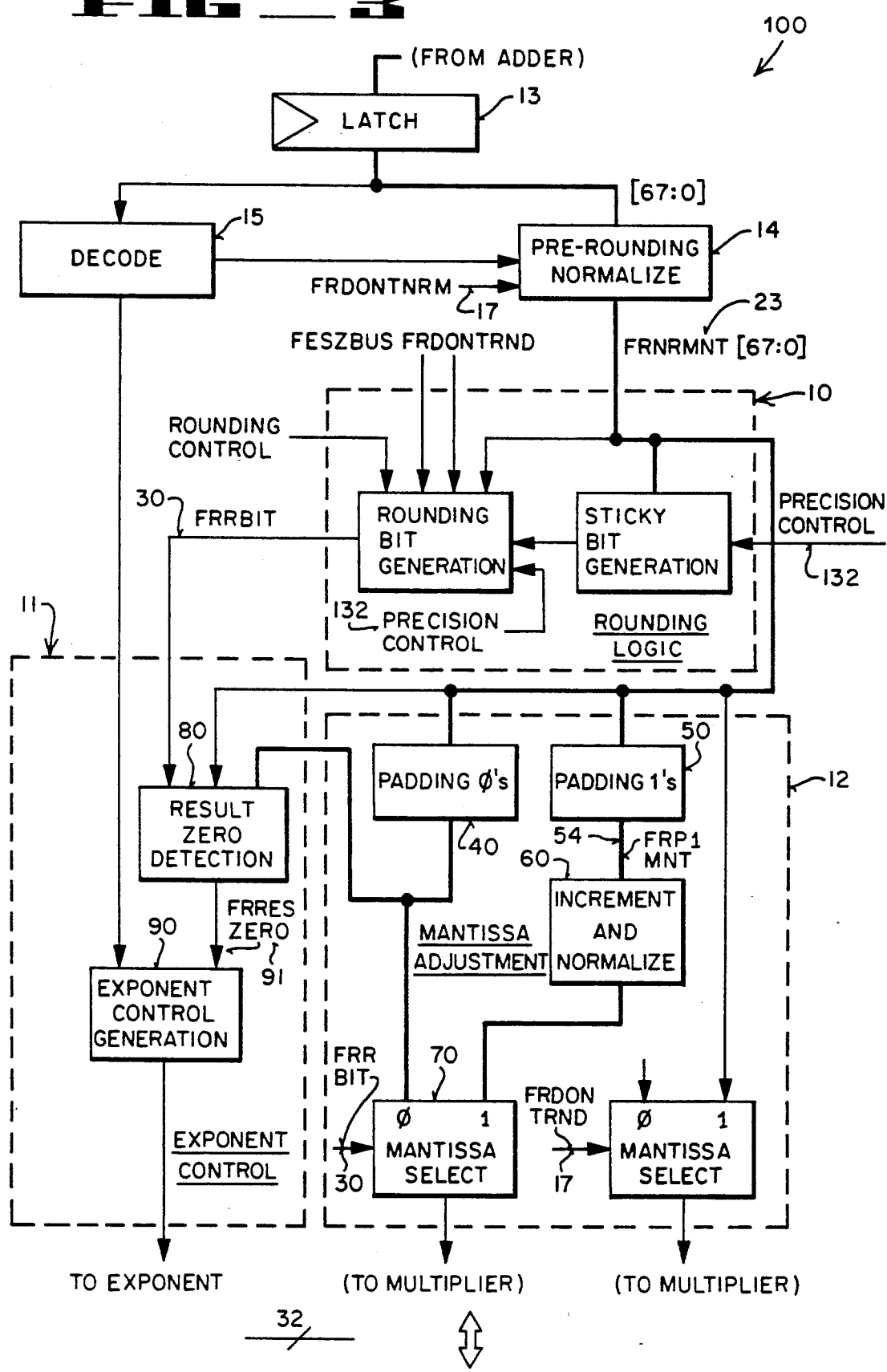
FIG_3

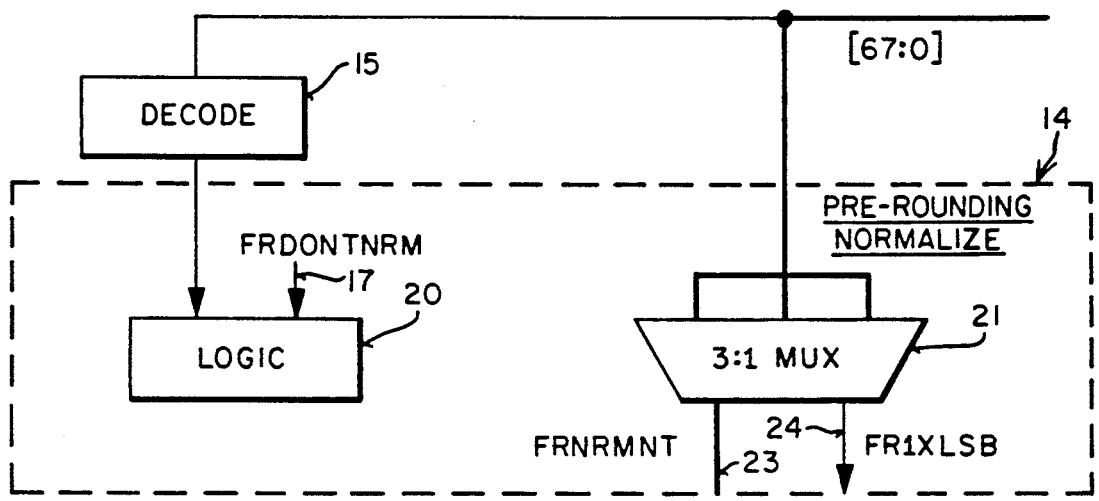
FIG_4
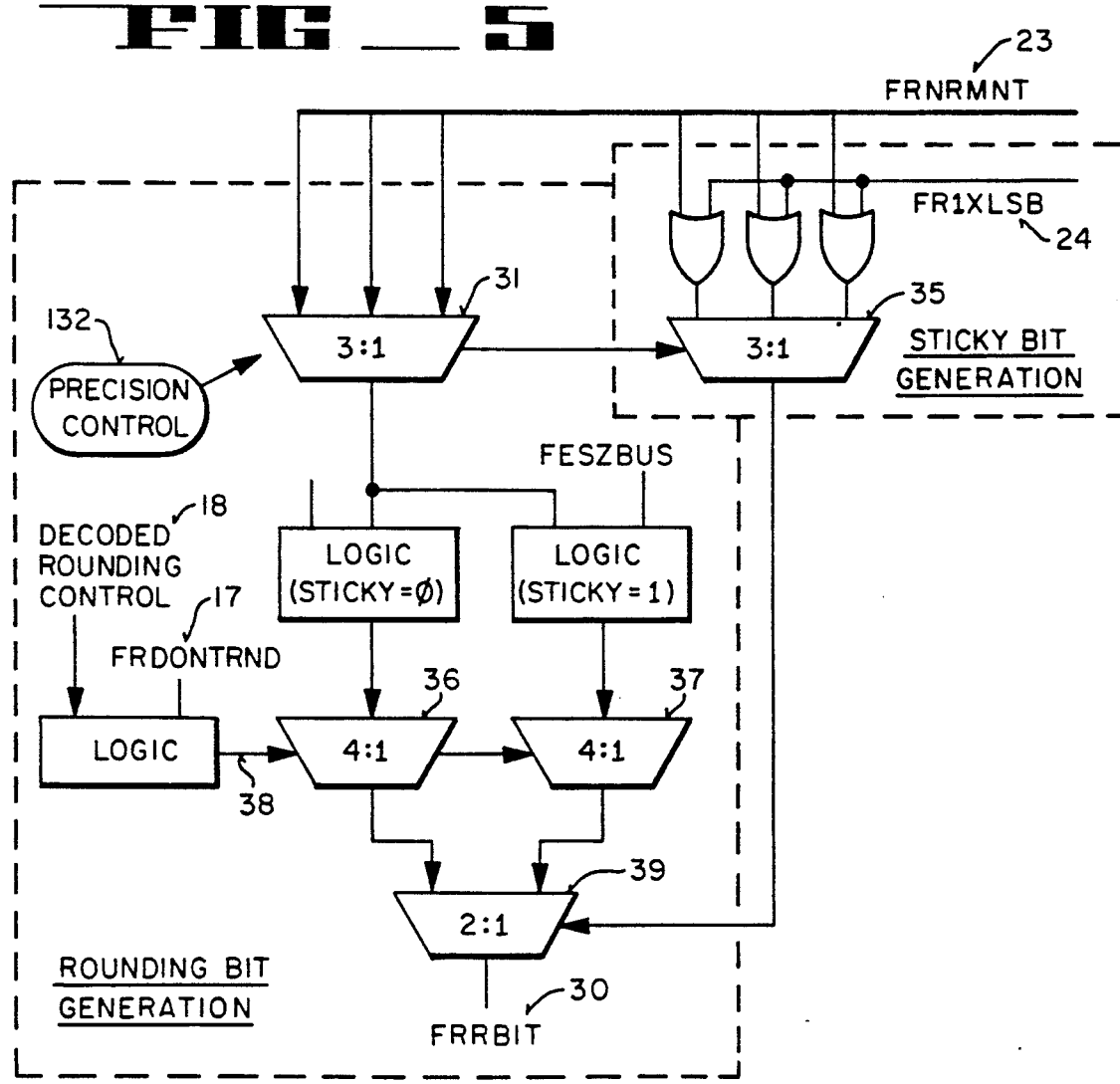
FIG_5

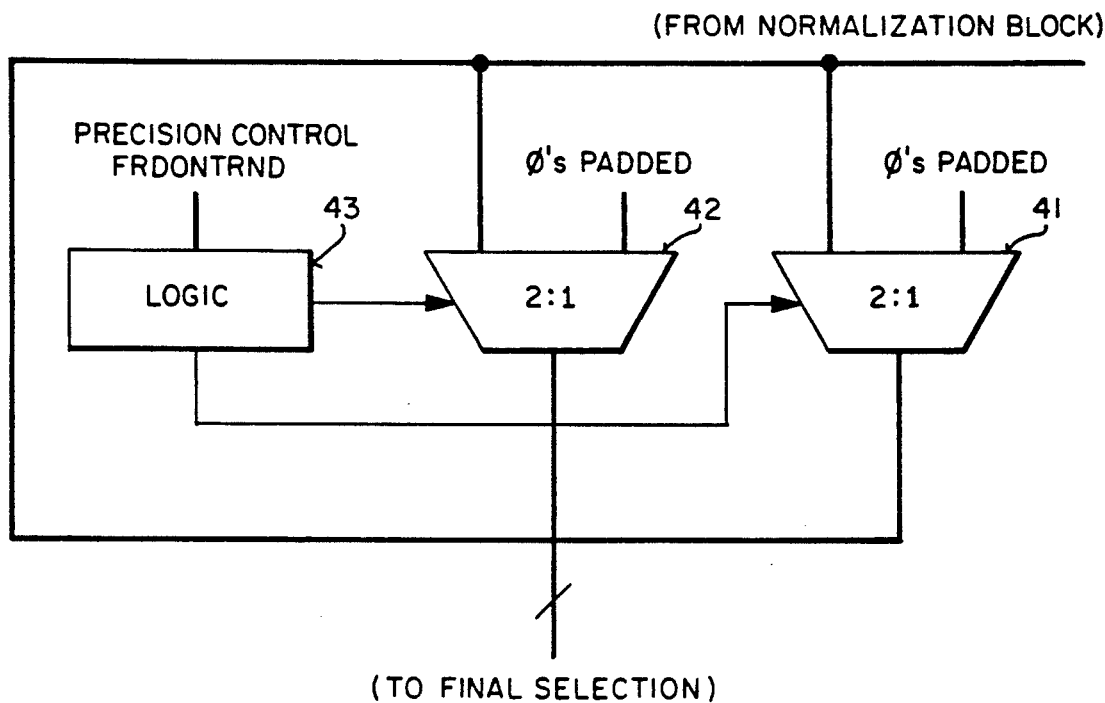
FIG_6
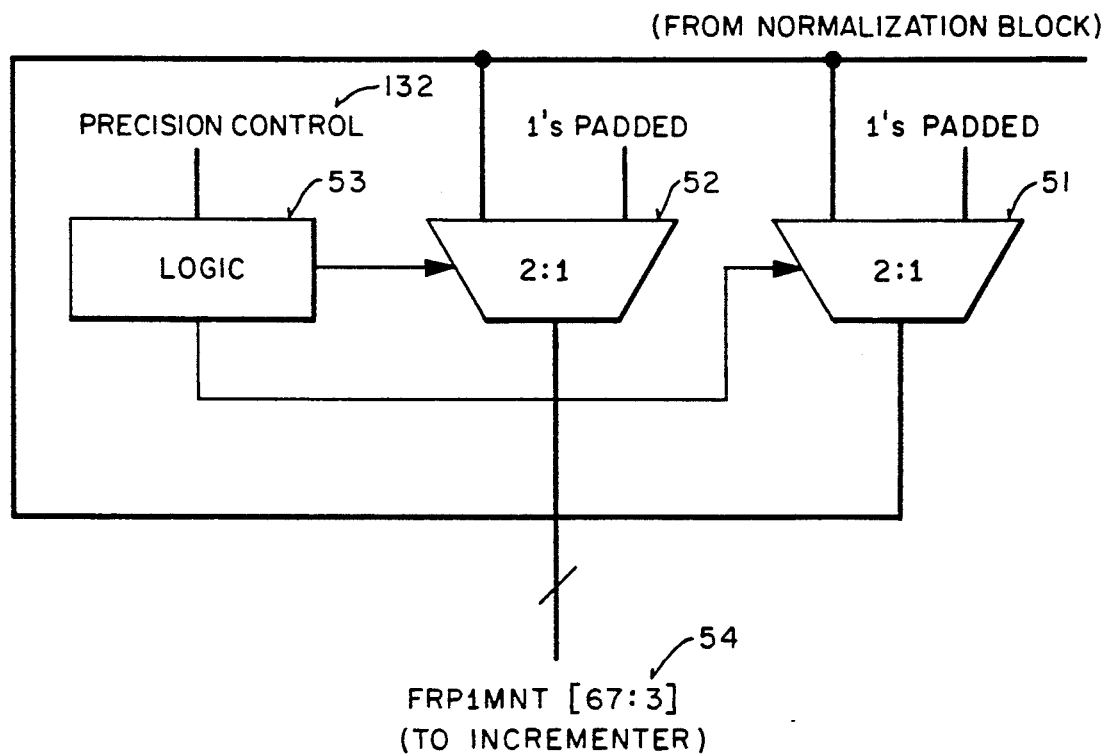
FIG_7

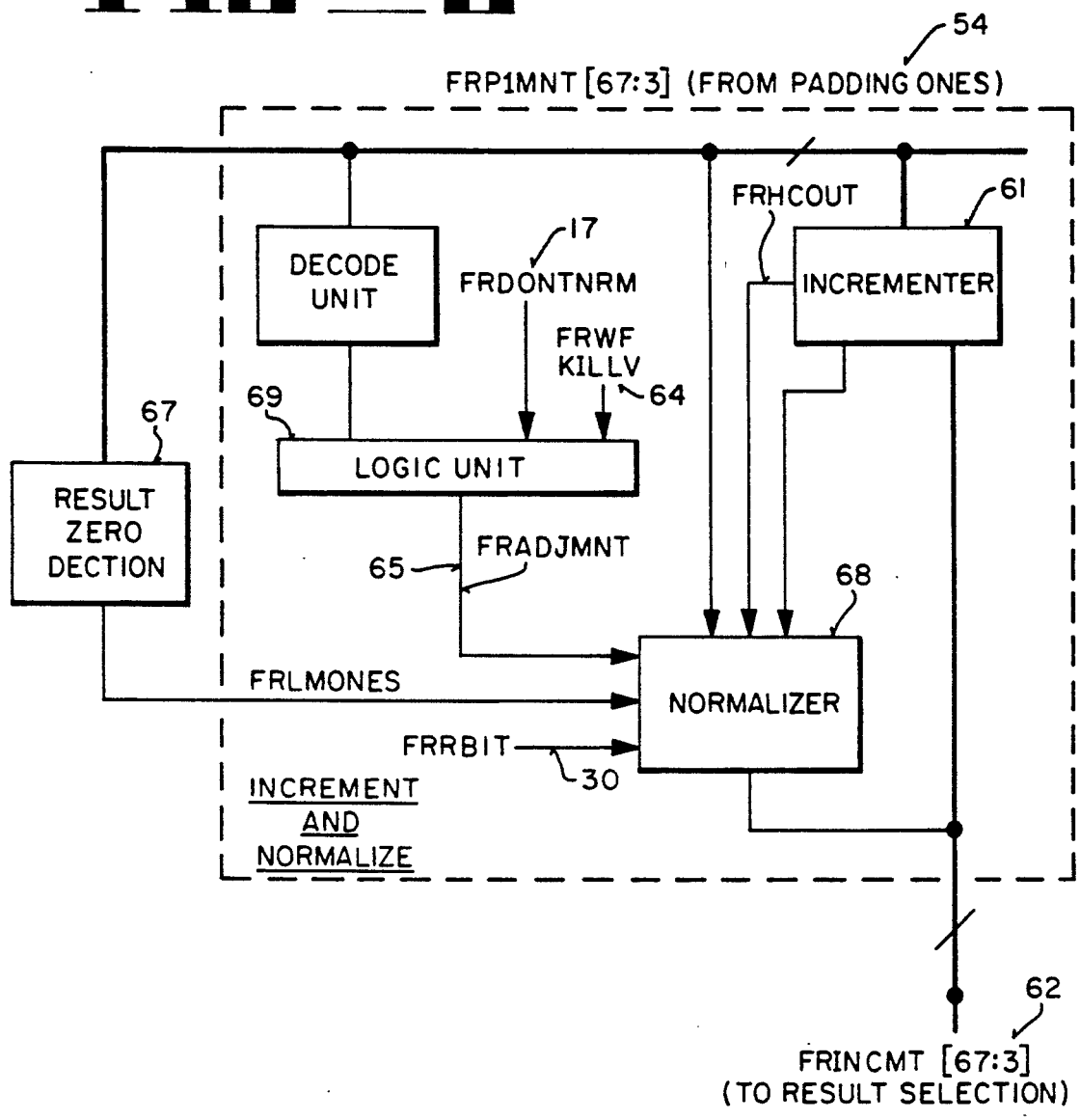
FIG_8
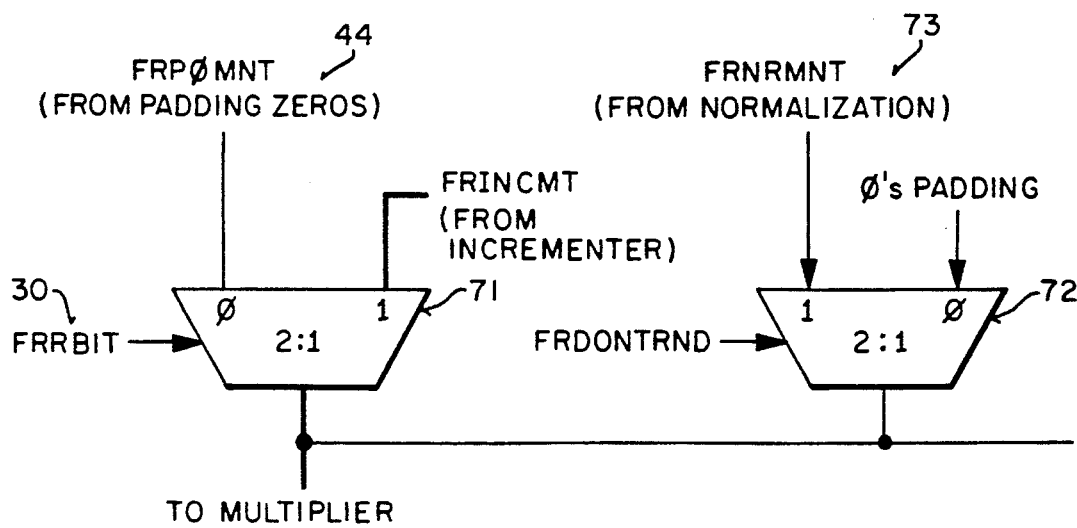
FIG_9

FIG_10
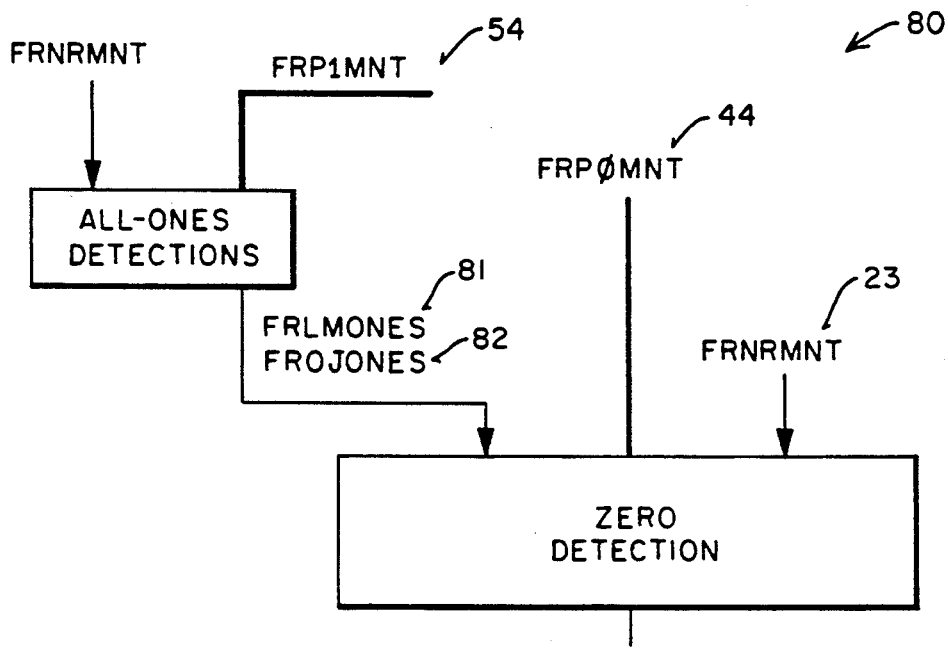
RESULT Ø = ALL-Ø's OR (ALL-1's AND RBIT =1 AND ROUNDING ENABLE AND MUST NOT ADJUST MANTISSA)
FIG_11
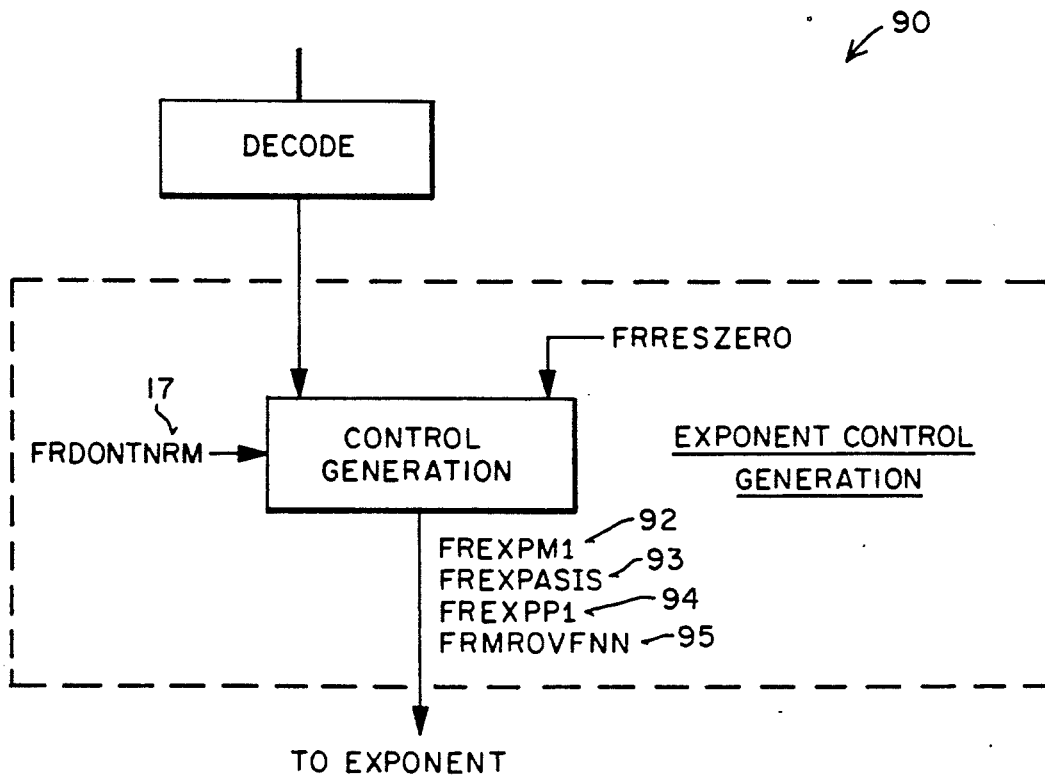

APPARATUS AND METHOD FOR ROUNDING OPERANDS

FIELD OF THE INVENTION

The present invention relates to the field of semiconductor microprocessors. In particular, this invention relates to the rounding function performed by a microprocessor for floating point operations.

BACKGROUND OF THE INVENTION

The present invention covers a scheme for rounding operands of varying lengths. An operand is defined as a number on which a mathematical operation is performed. Rounding an operand deletes one or more of the least significant digits and adjusts the retained part in accordance with some specified rule.

The present invention is incorporated in the architecture of the Intel 80586 microprocessor, also known as the 586 processor. Intel, 80586, and 586 are trademarks of Intel Corporation.

One purpose for rounding is to reduce the number of digits in the operand so that the rounded operand can fit within the word size of the microprocessor. Another purpose of rounding is to remedy the accuracy associated with the microprocessor's floating point operations. Floating point notation is a method of writing numeric quantities by using a characteristic and a mantissa. The characteristic represents the integral value of the number, and the mantissa represents the decimal value of the number. For example, the number 6.3124 is comprised of a characteristic of 6 and a mantissa of 3124.

In many situations, the result of a floating point operation exceeds the microprocessor's word size. For example, the addition of two n bit numbers might result in a sum of n+1 bits. Consequently, an overflow results if the word size is only n-bits long. To make the overflow fit, the number must be shifted one position to the right, the least significant bit (LSB) is deleted, and the exponent is increased. In order to dispose of the LSB while still preserving accurate results, the number is rounded according to one of several rounding methods.

Yet another reason for rounding is to scale the mantissa length to certain precisions. The longer the mantissa length, the more precise it becomes. However, the trade off is that calculations take longer because more bits are being manipulated. Commonly, precisions are adopted according to the specifications set forth in Institute Electrical and Electronic Engineers (IEEE) standard 754. The standard specifies four precisions: single, single extended, double, and double extended. Implementations are not required to have all four precisions.

By way of illustration, single precision is 24 bits in length. Double precision consists of 53 bits and extended precision consists of 64 bits. Thus, if the user selects single precision, every bit trailing LSB "43" (bits 42-0 of a 68 bit number) is deleted and set to "0". The LSB is rounded depending upon the rounding method chosen. Likewise, if the user selects double precision, the LSB is bit "14" and trailing bits "13-0" are set to zero. The appropriate rounding is then implemented. The same procedure occurs if extended precision is selected. The only difference is that the LSB is bit "3" and bits "2-0" are set to "0". Again, the appropriate rounding is performed. Accordingly, what is needed is a method to round a binary number based on the microprocessor word size, overflow condition, and specified precision formats.

Once it is determined that a number needs to be rounded, a rounding method must then be selected. Some of the more common rounding methods include: 1) chop, 2) roundup, 3) round down, and 4) round to nearest/even. Thus, a means to round a binary number according to the rounding mode is necessary.

In the prior art, one method for rounding was to implement a special adder which could add a "1" to any desired bit position. Another method in which rounding was implemented was to store rounding coefficients within a ROM look-up table. Thus, depending on the rounding mode, rounding calculations of whether to add a "1" or not, and the bit position to be rounded (i.e., precision), the special adder could add a "1" to a designated position accordingly or the appropriate coefficient is pulled from the ROM and added to the binary number. However, both methods mentioned above have a drawback in that they require the capability of adding a "1" to any one of several different bit positions. Hence, a method is needed to simplify and make the rounding operation faster by adding a "1" (if so required) to only one specified bit position under all circumstances.

Another problem associated with the prior art of rounding is that the rounding calculations had to be done first to determine whether to add a "1" or not. Next, the bit position must be determined. Then, the addition occurs, if so required. Typically, this process takes approximately seven clock cycles to implement. Consequently, a method is needed to process all three steps in parallel so that the entire process takes only one clock cycle.

SUMMARY AND OBJECTS OF THE INVENTION

One objective of the present invention is to round a binary number based on the microprocessor word size, overflow condition, and specified precisions.

Another objective of the present invention is to round a binary number according to the rounding mode.

Another objective of the present invention is to simplify and make the rounding operation faster by adding a "1" (if required) to only one specified bit position under all circumstances.

Another objective of the present invention is to define the specified bit position to which a "1" might be added so that an incrementer is used, instead of an adder.

Another objective of the present invention is to process all the rounding steps simultaneously such that rounding takes only one clock cycle instead of the typical seven clock cycles.

A microprocessor which includes a means for rounding a 68-bit binary number is described. In one embodiment, the 68-bit number is normalized by shifting it so that its overflow and J bits are "0" and "1" respectively. The exponent is adjusted accordingly such that it is incremented by one if shifted to the right and decremented by one if shifted to the left. This normalized 68-bit number is processed in parallel as follows: The rounding bit is derived from it; the number is rounded down; and the number is rounded up. Based on the rounding bit, either the rounded down or the rounded up number is chosen, whichever one corresponds to the 68-bit number being correctly rounded. The rounding bit is based on the precision and rounding mode selected and the Guard, Round, and Sticky bits.

In a preferred embodiment, a number of fraction bits are set to "0's" in the rounded down case, depending on the precision selected. In the rounded up case, a number of the fraction bits are set to "1's" depending on the precision selected. Then, the number is incremented by one. By processing these three steps in parallel, a binary number can be rounded much faster than if done in series. Furthermore, circuit simplicity is enhanced because an incrementer (which increments by one regardless of the precision) rather than an adder (which adds a one to different bit positions depending on the precision) is implemented.

BRIEF DESCRIPTION OF DRAWINGS

The present invention is illustrated by way of example and not limitation in the figures of the accompanying drawings, in which like reference numerals refer to similar elements and in which:

FIG. 1 illustrates an unrounded 68 bit binary number with the overflow bit, J bit, binary point, and the different positions that the KLGRS bits can occupy depending on the precision chosen.

FIG. 2 is a block diagram of the interface between the Rounder Section and other relevant sections within the microprocessor.

FIG. 3 is a block diagram of one preferred embodiment of the present invention detailing the internal structure of the Rounder apparatus.

FIG. 4 is a block diagram of the Pre-rounding Normalizer.

FIG. 5 is a block diagram of the Rounding Logic.

FIG. 6 is a block diagram of the Rounder path which assumes that the mantissa will not be incremented (not rounded up).

FIG. 7 is a block diagram of the Rounder path which assumes that the mantissa will be incremented (rounded up).

FIG. 8 is a block diagram of the Increment and Normalize block.

FIG. 9 is a block diagram of the Mantissa Select block.

FIG. 10 is a block diagram of the Result Zero Detector.

FIG. 11 is a block diagram of the Exponent Control Generator.

DETAILED DESCRIPTION

An apparatus within a microprocessor for rounding a 68 bit binary number is described. In the following description, numerous specific details are set forth, such as specific bit lengths, register contents, logic diagrams, formats etc., in order to provide a thorough understanding of the present invention. It will be obvious, however, to one skilled in the art that these specific details need not be used to practice the present invention. In other instances, well-known structures and circuits, have not been shown in detail in order not to unnecessarily obscure the present invention.

Brief Description of the Rounding Process and Common Terminology

Rounding a number deletes one or more of the least significant bits from a number and adjusts the retained part in accordance with some specified rule. A number of low order digits are disposed while preserving as accurate as possible the result, given a limited number of digits allowed by the machine.

There are basically three cases under which rounding can occur. The first case requires rounding due to carry out on the left. The second case requires rounding due to unequal exponents. The last case is when both the first and second conditions happen simultaneously. Ordinarily, in each case, three places are enough to compute the rounding calculations. Thus, two extra bits are required. These extra bits are called the Guard and Round bits. However, in the round to even mode, it is necessary to know whether or not there are any nonzero bits past the guard and round positions. This information can be stored in a single bit, called the Sticky bit. This is implemented by examining each bit as it is shifted off. As soon as a nonzero bit appears, the Sticky bit is set and remains set. To implement round to even, simply append the Sticky bit to the right of the Round bit just before rounding. Some common terms used in the rounding procedure are:

Mantissa: the decimal part of a common logarithm when the logarithm is written as the sum of an integer and a decimal.

L bit: the mantissa least significant bit and it is in a different bit position depending on the precision control being used.

K bit: the next bit to the left of the L bit.

GRS bits: the Guard, Round, and Sticky bits used to perform IEEE defined rounding. They are located to the right of the L bit.

J bit: the bit to the left of the binary point.

Overflow bit: mantissa bit "67".

Rounding bit: the output from the rounding logic to be added to the mantissa at the L bit position (not to be confused with the R or round bit).

These definitions are consistent with the IEEE 754 standard, whose terminology and standards are herein adopted for purposes of the present discussion.

In general, the KLGRS bits are used together with the sign bit to calculate the rounding bit. The position of these bits vary depending on the precision selected by the user. In a preferred embodiment of the present invention, three degrees of precision are available. They are single, double, and extended precision. FIG. 1 shows a 68 bit number to be rounded. Referring to FIG. 1, it can be seen that single precision is the least accurate, having only 24 bits of precision versus double precision having 53 bits and extended precision having 64 bits of precision. FIG. 1 also shows the overflow bit, J-bit, binary point, and the different positions that the KLGRS bits can occupy depending on the precision chosen. The table below details the bit positions that each of the KLGRS bits occupies in each precision.

TABLE 1

|        | SINGLE   | DOUBLE   | EXTENDED |
|--------|----------|----------|----------|
| K BIT  | 44       | 15       | 4        |
| L BIT  | 43       | 14       | 3        |
| GUARD  | 42       | 13       | 2        |
| ROUND  | 41       | 12       | 1        |
| STICKY | OR (40-0)| OR (11-0)| 0        |

The rounding bit also depends on the rounding mode selected by the user. The preferred embodiment of the present invention supports four rounding modes defined in the IEEE 754 standard. They are: 1) chop-round toward zero, 2) round up toward positive infinity, 3) round down toward negative infinity and 4) round to nearest or even. Table 2 below describes the equations for calculating the rounding bit for different cases.

TABLE 2

| Rounding Mode | not normal normal | normal case | overflow case |
|---|---|---|---|
| Chop | 0 | 0 | 0 |
| Round up | (sign)' (R + S) | (sign)' (G + R + S) | (sign)' (L + G + R + S) |
| Round down | (sign) (R + S) | (sign) (G + R + S) | (sign) (L + G + R + S+) |
| Round to nearest/even | RS + GRS' | G(R + S) + LG(R + S)' | L(G + R + S) + KL(G + R + S)' |

The not normal case is where both the overflow bit and J bits are "0". The normal case is where the overflow bit is "0" and the J bit "1". In the overflow cases, the overflow bit is "1" while the J bit can be either "1" or "0".

Another relevant concept to the topic of rounding is that of normalization. A number is said to be normalized if the bit to the left of the binary point (J bit) is "1" and the overflow bit is "0". If the overflow bit is set (meaning that the mantissa has overflowed) or if both the overflow and j bits are "0", the number is not normalized. In the preferred embodiment of the present invention, for real operations, the number to be rounded must be normalized prior to the rounding operation. If the number is not normal, it is shifted to become normalized, with the corresponding correction of the exponent. In some circumstances whereby the hardware needs to be configured in some particular fashion, known as primitive micro-operations, the mantissa need not be completely adjusted or adjusted at all.

Interface between the Rounder Apparatus and Other Units Within the Microprocessor A Rounder apparatus must take an unrounded mantissa, normalize it, perform the rounding according to the precision and rounding mode, and write the result into a register file. A block diagram showing this interaction and the currently preferred embodiment of the interface between the Rounder apparatus and other relevant devices within the microprocessor is shown in FIG. 2. Referring to FIG. 2, Rounder 100 gets input data from Adder 120, Divider 130, and Exponent 140 and sends its results to Exponent 140, Controller/Register File 150, and Multiplier 160. Rounder 100 gets activated by Exponent 140 when the result mantissa is ready to be operated on. Adder 120 multiplexes its result mantissa with the result mantissa from Divider 130 and then drives the output of the multiplexer to Rounder 100. Whereupon, Rounder 100 takes the unrounded mantissa from Adder 120 and gets control signals such as precision and rounding control, primitive micro-operation control, sign of the result, and normalize, round, and post-rounding normalize enables. These signals are used during the rounding bit calculation and mantissa adjustment. The result mantissa is driven to Multiplier 160.

The result mantissa out of Rounder 100 is 68 bits wide and contains a mantissa overflow bit, an explicit leading bit (also called the J bit), the fraction bits, and the Guard, Round, and Sticky bits. The value of all these bits depends on the type of micro-operation executed by Adder 120 and Divider 130. In case of a real micro-operations, Rounder 100 performs normalization, rounding, and post-rounding normalization on the input mantissa. In this case, Rounder 100 guarantees the value of the Overflow, Guard, Round, and Sticky bits to be "0", and the value of the J bit to be "1".

In case of a primitive micro-operation, the rounding, precision, and primitive micro-operation control received from Exponent 140 may require Rounder 100 to perform a combination of normalization and rounding actions on the mantissa. Thus, the mantissa Overflow, J, Guard, Round, and Sticky bits are not guaranteed to assume a pre-defined value. The resulting mantissa is sent to Multiplier 160 to be multiplexed with the output of Multiplier 160 and then written into Controller/Register File 150. Rounder 100 provides Controller Register File 150 with additional information about the result, namely, if the mantissa was rounded up, if the result is zero, and if the result is inexact. Furthermore, based on the adjustments made to the mantissa, Rounder 100 instructs Exponent 140 on how to adjust the result exponent before it is sent to Controller/Register File 150.

The Rounder Apparatus

The Rounder apparatus will now be discussed in more detail. The Rounder has three main functions: rounding bit calculation, exponent control generation, and result mantissa adjustment. FIG. 3 shows the block diagram of the internal structure of Rounder 100. The three main functions are performed by Rounding Logic 10, Exponent Control 11, and Mantissa Adjustment 12. As discussed above, the 68-bit unrounded mantissa comes from the Adder. It is then latched by latch 13. This latched unrounded mantissa goes through Pre-rounding Normalizer 14.

A more detailed block diagram of Pre-rounding Normalizer 14 is shown in FIG. 4. As seen from FIG. 4, Pre-rounding Normalizer 14 comprises Logic Block 20 and 3:1 Multiplexer 21. This Multiplexer 21 is controlled by bits 67 and 66 of the unrounded mantissa and "frdontnrm" signal 17. "Frdontnrm" signal 17 is set for some of the primitive micro-operations and indicates that the mantissa must not be normalized. For real micro-operations, the unrounded mantissa will normally need approximately one shift in order to become normalized. Decode Block 15 takes bits 67 and 66 of the unrounded mantissa and generates three signals. The first signal is when bits 67 and 66 are both zero (00 case). The mantissa has to be shifted left once to get normalized. Second, when bits 67 and 66 are zero and one respectively (01 case), the incoming mantissa is already normalized and doesn't need any adjustment. Third, when bit 67 is 1 (1× case) the incoming mantissa has an overflow and the mantissa has to be shifted right. The table below shows the required operation on the unrounded mantissa as a function of bits 67 and 68 and "frdontnrm" signal 17.

TABLE 3

| Bits 67 and 66 | frdontnrm | mantissa |
|---|---|---|
| xx | 1 | as is |
| 1x | 0 | shift right 1 |
| 01 | 0 | as is |
| 00 | 0 | shift left 1 |

The output from Pre-rounding Normalize 14 is "frntmt" 23 (a 68 bit normalized unrounded number) and "fr1×lsb" 24. The "fr1×lsb" signal 24 is used when the mantissa is shifted right. It preserves the LSB which was shifted out so that later on, the (Sticky) bit can be properly calculated. For all other cases, this signal is set to "0".

Referring back to FIG. 3, it can be seen that the normalized unrounded number, "frnrmnt" 23, is sent in parallel to Rounding Logic 10, Mantissa Adjustment 12, and Exponent Control 11. In the preferred embodiment of the present invention, each of these blocks performs its operations in parallel, i.e. simultaneously, based on the "frnrmnt" and control signals. Each of these blocks is discussed in detail below.

FIG. 5 is a detailed block diagram of Rounding Logic 10. The purpose of this block is to calculate "frrbit" 30 which is the rounding bit to be added to the mantissa when rounding is allowed. As discussed above, the input mantissa to this block is "frnrmnt" 23 from the Pre-round Normalize block which guarantees that for real operations, the mantissa inputted into the rounding logic is normalized (01 cases). Referring back to table 2, in order to calculate the rounding bit in the 01 case, the LGRS and sign bits are required. The LG bits 40 are extracted from "frnrmnt" 23 via 3:1 Multiplexer 31 according to precision control 132. Sign bit 33 is received from the Exponent Control block. For double and single precisions, sticky bit 34 is the result of an OR operation on a number of fraction bits. Note that this OR operation also includes "fr1×lsb" 24, which is the LSB of the 1× case before pre-rounding normalization. For each precision, the corresponding fraction bits are extracted from "frnrmnt 23", and OR-ed together with "fr1×lsb" 24. The three results are then passed through 3:1 Multiplexer 35 which then selects the correct sticky bit according to precision control 132.

In the currently preferred embodiment of the present invention, timing degradation due to having to wait for the OR operation to be completed before starting the rounding bit calculation is minimized by implementing two parallel units. One unit assumes sticky to be "1", and the other unit assumes sticky to be "0". The logic equation for the two parallel units can be further simplified by including the R bit as part of the sticky bit calculation. Each unit generates four possible rounding bits using the equations shown in Table 4 below. These equations show how to calculate the rounding bit when the input mantissa is normalized (01 case).

TABLE 4

| rounding control | sticky = 1 | sticky = 0 |
|---|---|---|
| don't round | 0 | 0 |
| chop | 0 | 0 |
| round up | sign' | sign' (G) |
| round down | sign | sign (G) |
| nearest/even | G | LG |

For primitive micro-operations that do not normalize the mantissa but require rounding, the rounding bit is calculated disregarding the inaccuracy created by the mantissa being unaligned. The 4:1 Multiplexer 36 for sticky="0" path and the 4:1 Multiplexer 37 for sticky="1" path are used to select one out of the four possible rounding bits according to rounding control 38. Rounding control 38 is the combination of the decoded rounding control received from the Exponent block and "frdontrnd" 17. The "frdontrnd" signal is set during some primitive micro-operations and indicates that the mantissa must not be rounded. The final rounding bit, "frrbit" 30, is selected with 2:1 Multiplexer 39 using the S bit (the result value of the sticky bit calculation).

The next block to be disclosed is the Mantissa Adjustment. Referring back to FIG. 3, it can be seen that Mantissa Adjustment 12 comprises the following units: Padding 0's 40, Padding 1's 50, Increment and Normalize 60, and Mantissa Select 70. In this block, the mantissa is rounded according to the value of the rounding bit, "frrbit". In addition, the mantissa is post-rounding normalized, if required. Before the rounding takes place, a number of fraction bits have to be set to zero as per the precision control. Then, the rounding bit is added at the L bit position corresponding to the precision. The input mantissa to this block is, again "frnrmnt."

In the currently preferred embodiment of the present invention, in order to speed up the process of rounding to precision and post-rounding normalization, the mantissa is processed by two separate units in parallel. One unit assumes that the mantissa will be chopped according to the precision and another unit assumes that the mantissa will be rounded up. The post-rounding normalization is then performed on the mantissa out of the rounded up unit. The final output mantissa is selected using the value of the "frrbit" signal. The mantissa will be chopped according to the precision if either rounding is not enabled ("frdontrnd"17 is set depending on the micro-operation being performed), rounding control indicates chop (toward zero), or the value of the frrbit is "0".

FIG. 6 shows a block diagram of the unit which assumes that the mantissa will be chopped according to the precision. The corresponding fraction bits are set to "0" using 2:1 Multiplexer 41 and 2:1 Multiplexer 42. The two Multiplexers are controlled by Logic block 43 which decodes precision control 132 and the "frdontrnd" signal. The following two truth tables describe how the multiplexers are controlled. The colons represents "through" e.g. frnrmnt [13:3] means bits 13 through 3 of bus frnrmnt. Table 5 describes the operation of Multiplexer 41, and Table 6 describes the operation of Multiplexer 42.

TABLE 5

| frdontrnd | precision | frp0mnt[13:3] |
|---|---|---|
| 0 | x | frnrmnt[13:3] |
| 1 | extended | frnrmnt[13:3] |
| 1 | not extended | '0::11 |

TABLE 6

| frdontrnd | precision | frp0mnt[42:14] |
|---|---|---|
| 0 | x | frnrmnt[42:14] |
| 1 | not single | frnrmnt[42:14] |
| 1 | single | '0::29 |

The "frp0mnt" signal 44 is the output assuming that the mantissa will be chopped according to the precision. The frp0mnt [67:3] mantissa is sent to the final Mantissa Select. Bits [2:0] are ignored since they are relevant only for the final mantissa selection operation where they will be set to "0" if required.

The other path assumes that the mantissa is going to be rounded up. Consequently, a number of fraction bits of the frnrmnt mantissa are replaced by "1's" per precision control. This is done to prepare the mantissa for the incrementer to ensure that the rounding will be done at the L bit corresponding to the precision selected. This operation is very similar to the previously discussed path of padding "0's" to the mantissa, except that the "frdontrnd" signal is a "don't care" because this path will only be chosen in case of a rounding up. Thus, as shown in block diagram FIG. 7, only precision control 132 is necessary to control the two 2:1 Multiplexers 51 and 52 after being decoded by Logic block 53. The output signal, "frp1mnt" 54, is sent to the Increment and Normalize block. Note that bits [2:0] are not necessary since the micro-operations that would exercise this path would set them to "0". Tables 7 and 8 describe the operation of Multiplexers 51, and 52, respectively.

TABLE 7

| precision | frp1mnt[13:3] |
|---|---|
| extended | fnrmnt[13:3] |
| not extended | '1::11 |

TABLE 8

| precision | frp1mnt[42:14] |
|---|---|
| single | '1::29 |
| not single | fnrmnt[42:14] |

After the mantissa has been properly padded with "1's", it is passed through the Increment and Normalize block as shown in detail in FIG. 8. This block contains a 64-bit adder 61 which serves the purpose of incrementing the mantissa at the L bit position corresponding to precision control. The incremented mantissa, "frincmt" 62 might need to be re-normalized. Such a case is detected with the carry out of the incrementer, "frhcout" 63, and controlled with "frwfkillv" 64 and "frdontnrm" 17 signals via Logic block 69. The "frwfkillv" 64 signal is set during the execution of a number of primitive micro-operations and indicates that post-rounding normalization must not be done. If the "frdontnrm" 17 signal equals "0" then the unrounded mantissa must be normalized. Bits frp1mnt [67,66] are checked for a "01" value and combined with the "frwfkillv" 64 and "frdontnrm" 17 signals to calculate "fradjmnt" 65 which indicates that the mantissa should be adjusted after rounding. The "frlmones" 66 signal coming from the result zero detecting logic 67 indicates that "frp1mnt" [65:3] is all "1's". The "frrbit" 30 signal is the rounding bit out of the rounding bit logic. These signals are combined with "frhcout" 63 (carry out of the 64-bit adder/incrementer 61), frp1mnt [67], and bit [66] out of the 64-bit adder/incrementer 61 to compute the two new values of frincmt [67,66] by Normalize block 68. After the normalization step, the frincmt [67:3] 62 is driven to the Mantissa Select block. The truth table shown below indicates how to fix the mantissa in case post-rounding normalization is necessary.

TABLE 9

| frwfkillv | frdontnrm | frp1mnt[67,66] | frincmt[67,66] |
|---|---|---|---|
| x | 1 | 00 | {00,01} |
| x | 0 | 00 | xxxxx |
| x | 1 | 01 | {01,10} |
| 0 | 0 | 01 | 01 |
| 1 | 0 | 01 | {01,10} |
| x | 1 | 10 | {10,11} |
| x | 0 | 10 | xxxxx |
| x | 1 | 11 | {11,00} |
| x | 0 | 11 | xxxxx | if (frwfkillv = 0) AND (frdontnrm = 0)
AND (frp1mnt[67,66] = 01) then
frincmt[67] = 0
frincmt[66] = 1
else
frincmt[[67] = frp1mnt[67] XOR frhcout
frincmt[66] = frincmt[66]

The brackets appearing in Table 9 depict the two possible outcomes of the mantissa increment. The cases marked as xxxxx are the ones in which the value for bits [67,66] would be impossible to obtain given the value of the "frdontnrm" 17 signal. For example, if "frdontnrm" 17 is equal to one and "frp1mnt" [67,66] are both equal to zero, the resulting bits "frincmt"[67,66] (after the increment) could be either 00 or 01. But "frdontnrm" 17 being equal to zero guarantees that bits "frp1mnt"[67,66] have to be 01, so this case is marked as xxxxx in the table.

Eventually, both units provide their outputs to the Mantissa Select block which is shown in FIG. 9. The 2:1 Multiplexer 71 selects between the mantissa with padded "0's" ("frp0mnt" 44) and the mantissa coming out of the incrementer ("frincmt" 62) based on the value of the rounding bit ("frrbit" 30). Multiplexer 72 is used to set bits [2:0] of the result mantissa to either "0" in case that rounding is enabled ("frdontrnd" 17 equal to "0") or made equal to "fnrmnt" [2:0] 73 in case that rounding is enabled.

Referring back to FIG. 3, the last main block of Rounder 100 is Exponent Control 11. The Exponent Control comprises the Result Zero Detection 80 and Exponent Control Generation 90 block. The exponent control signals are derived from bits [67,66] via Decode block 15 in combination with a start indication from the Exponent or Divider section, "frdontnrm" (don't normalize signal), and "frreszero" 91 (result is zero). These signals are driven to the Exponent section to adjust the exponent according to the mantissa adjustments performed in Rounder 100.

FIG. 10 is a block diagram of the Result Zero Dectection block. This section performs an all ones detection on "frp1mnt" 54 (mantissa with padded ones) and a zero detection on "frp0mnt" 44 (mantissa with padded zeros) using information from the all ones detection. Bits of "fnrmnt" 23 are also used. Out of the all ones detection, signal "frlmones" 80 indicates that "frp1mnt"[65:3] is all ones, and signal "frojones" 82 indicates that "fnrmnt" [67,66] are ones.

The all ones and zero detection are performed on the mantissa that have already been modified according to precision control ("frp0mnt" 44 and "frp1mnt" 54) because, depending on the precision selected, padding zeros or ones to a mantissa could transform it into a zero or an all ones. The all ones information is required for the zero detection because rounding can also cause a mantissa to become a zero.

FIG. 11 shows Exponent Control Generation 90. The decoded bits "frmubus" [67,66] used in the pre-rounding normalization block are also used here to calculate the exponent control signals. The control signals are asserted when normalization is allowed ("frdontnrm" equal zero) provided there is a start signal ("frwfstrt" equal to one) and the result is not zero ("frreszero" equal to zero). The truth table below describes the exponent control based upon these signals.

TABLE 10

| frwfstrt | frdontnrm | frreszero | case | control |
|---|---|---|---|---|
| 0 | x | x | x | 0 |
| 1 | 1 | x | x | exp |
| 1 | x | 1 | x | 0 |
| 1 | 0 | 0 | 00 | exp − 1 |
| 1 | 0 | 0 | 01 | exp |
| 1 | 0 | 0 | 1x | exp + 1 |

Three of the exponent control signals ("frexpmone" 92, "frexpasis" 93, and "frexppone" 94) are based on the state of bits [67,66] of the unrounded mantissa and cause the exponent to be decremented by one, left as is, or incremented by one. A fourth signal ("frmrovfnn" 95) is generated based on the state of bits [67,66] in the post-rounding normalization step. This signal indicates that the post-rounding normalization created a mantissa overflow and thus the Exponent Section must adjust the exponent accordingly (i.e., increment it). For example, "frmrovfnn" 95 together with "frexpp1" 94 will cause the exponent to be incremented by two. This signal is qualified by pre-rounding normalization being enabled ("frdontnrm" equal to zero), post-rounding normalization being enabled ("frwfkillv" equal to zero), and by the result not being a zero ("frreszero" equal to zero). The table below is an overflow when rounding truth table.

TABLE 11

| frwfstrt | frdontnrm | frwfkillv | frreszero | frlmones | frrbit | frmrovfnn |
|---|---|---|---|---|---|---|
| 0 | x | x | x | x | x | 1 |
| 1 | 1 | x | x | x | x | 1 |
| 1 | 0 | 1 | x | x | x | 1 |
| 1 | 0 | 0 | 1 | x | x | 1 |
| 1 | 0 | 0 | 0 | 0 | x | 1 |
| 1 | 0 | 0 | 0 | 1 | 0 | 1 |
| 1 | 0 | 0 | 0 | 1 | 1 | 0 |

In the currently preferred embodiment of the present invention, the functionality of the Rounder in the presence of real operations differs than in the presence of primitive operations.

For micro-operations, both rounding and normalization are enabled ("frdontnrm", "frdontrnd", and "frwfkillv" are all zero). In one preferred embodiment of the present invention, since all real arithmetic operations are executed using normalized operands in internal precision format, it is guaranteed that the mantissa coming into Rounder will not require a pre-rounding normalization shift greater than one position (either left or right). Therefore, "frnrmnt" (the mantissa after the normalization block) is a normalized number.

The appropriate bits are extracted from "frnrmnt" and used (along with sign, precision control and rounding control) to calculate the rounding bit, "frrbit". The "frp0mnt" (mantissa padded with zeros as per precision control) and "frp1mnt" (mantissa padded with ones as per precision control) mantissas are formed and "frp1mnt" is passed through the 64-bit incrementer and post-rounding normalization block. If an overflow is created during rounding, the Rounder section adjusts the mantissa again. Thus, the mantissa coming out of the increment and normalize block ("frincmt") is normalized. The rounding bit "frrbit," is used to select the final result mantissa "frmzbus" [67:3] between the "frrbit," is used to select the final result mantissa "frmzbus" [67:3] between the rounded mantissa "frincmt" [67:3] and the mantissa padded with zeros "frp0mnt" [67:3]. The "frdontrnd" signal is used to select the value of bits "frmzbus" [2:0]. For real operations these three bits are set to zero.

For primitive micro-operations, rounding and normalization may not be enabled at the same time, i.e., "frdontnrm", "frdontrnd", and "frwfkillv" may assume a number of combinations of values. If both rounding and normalization are allowed, the behavior is the same as for the real micro-operations case. In both rounding and normalization are disabled, then the mantissa passes through Rounder untouched.

If normalization is not allowed and rounding is enabled, the number coming into the Rounder Section is passed untouched through the normalization block. In this case, the rounding bit calculation logic uses bits that are off from their correct position as defined previously. If during rounding, an overflow is created and post-rounding normalization is disabled ("frwfkillv" equal to one), then the mantissa doesn't get adjusted back.

If normalization is enabled but rounding is disabled, the Rounder section detects this case, and the rounding bit, "frrbit," is forced to zero. Thus, the result mantissa chosen, "frp0mnt," is the one that didn't go through the increment and normalize block. In this case, bits [2:0] of the result are not forced to zero but instead, are passed from bits [2:0] of the normalized mantissa.

AN EXAMPLE

This subsection will describe by way of an example how a binary operand will be rounded according to the current embodiment of the present invention. Given an arbitrary 64 bit operand and given that the user selects single precision and a rounding mode of round to nearest, the current embodiment of the present invention will function as follows. Suppose that bits 44-40 of the arbitrary 64 bit operand are 0, 0, 1, 1, and 0 respectively. This defines the values of the bits as follows: $K=0$, $L=0$, $G=1$, $R=1$, and $S=0$. The 64 bit operand will first be latched and then sent simultaneously, via a 64 bit bus, to three sections.

The first section computes the rounding bit. The rounding bit is set to "1" if the operand is to be rounded up. Otherwise, it will be set to "0" (signifying that the operand is to be chopped according to the precision). The rounding bit is determined by the equations given in Table 2. In our example, assuming a normal case, the rounding bit is calculated by the equation $G(R+S)+LG(R+S)'$. Substituting the given bits yields the following logic operations: {[1 AND (1 OR 0)] OR [(0 and 1) AND NOT (1 OR 0)]}. Solving this equation yields (1 AND 1) OR (0 AND NOT 1) which can be further reduced to 1 OR (0 AND 0) which equals (1 OR 0), thereby giving a final answer of 1. Thus, the rounding bit is set to "1", indicating that the operand is to be rounded up.

Meanwhile, the same 64 bit operand is being sent down two separate paths to two different sections. One path assumes that the operand is to be chopped according to the precision. Using our example, "0"s" are padded into bits 42-3. In our example, bits 67-43 remain as they are and bits 42-3 are set to "0."

The other path assumes that the operand is to be rounded up. Using our example, "1's" are padded into bits 42-3. Next, the padded mantissa will be incremented by one. The effect of the incrementation is to add a 1 to the LSB (round it up) and setting the trailing bits to "0's" ($1+1=0$ with a carry, etc.). In our example, a "1" will be added to bit 43. This results in bits 67-42 remaining as they are, bit 43 being a "1", and bits 42-3 being set to "0."

Finally, either the rounded up or rounded down path will be selected as the output. The selection is based on the rounding bit. In our example, the rounding bit is a "1" which corresponds to the rounded up path being selected. The result is a properly rounded operand with the proper precision (i.e., bits 67-44 remains the same, bit 43 is set to a "1" and bits 42-3 are set to "0's").

Thus, an apparatus and method for rounding operands has been described.

What is claimed is:

1. In a microprocessor, a rounding apparatus for rounding a floating point binary number having a characteristic bit, a plurality of mantissa bits, and at least one exponent bit, said rounding apparatus comprising:
   an input means for inputting a precision signal specifying one of said plurality of mantissa bits as being a least significant bit;
   a latch for latching said floating point binary number;
   a shift register coupled to said latch for shifting said floating point binary number to generate a normalized number;
   a first multiplexer coupled to said shift register for setting all bits of said plurality of mantissa bits to the right of said least significant bit to zeros for generating a round-down number;
   a second multiplexer coupled to said shift register for setting all bits of said plurality of mantissa bits to the right of said least significant bit to ones;
   an incrementer for incrementing said binary number having all bits to the right of said least significant bit set to ones for generating a round-up number;
   a rounding bit generator coupled to said latch for generating a rounding bit which is used to select one of said round-up number and said round-down number for output from said rounding apparatus;
   a switch coupled to said rounding bit generator for selecting one of said round-up number and said round-down number for output according to said rounding bit, wherein said round-up number, said round-down number, and said rounding bit are generated in parallel for minimizing a number of clock cycles required to round said floating point binary number.

2. The microprocessor of claim 1, wherein said rounding bit is generated according to a rounding mode.

3. The microprocessor of claim 2, wherein said rounding mode includes one of chop, round up, round down, and round to nearest/even.

4. The microprocessor of claim 3, wherein said precision includes one of single, double, and extended precisions.

5. The microprocessor of claim 4, wherein said rounding bit generator generates said rounding bit based on a guard, round, and sticky bit of said plurality of mantissa bits.

6. The microprocessor of claim 5, wherein said binary number comprises 68 bits.

7. An apparatus for rounding a floating point binary number having a bit representing a characteristic of said number and a plurality of bits representing a mantissa of said number, wherein rounding of said number is performed according to a precision, said apparatus comprising:
   an inputting means for inputting said precision, wherein said precision specifies one bit of said plurality of mantissa bits as a least significant bit;
   a round-down means coupled to said inputting means for generating a rounded down number by setting each bit of said mantissa to the right of said least significant bit to a zero;
   a round-up means coupled to said inputting means for generating a rounded up number by setting each bit of said mantissa to the right of said least significant bit to a one and incrementing said mantissa by one;
   a generator means coupled to said round-down means and said round-up means for generating a rounding bit specifying whether said number is to be rounded-up or down;
   a selecting means coupled to said generator means for selecting one of said round-down number and said round-up number for output according to said rounding bit, wherein said means for generating said rounded down number, said means for generating said rounded up number, and said means for generating said rounding bit are processed in parallel.

8. The apparatus of claim 7 further comprising a latching means coupled to said inputting means for latching said binary number prior to generating said rounded down number, said rounded up number, and said rounding bit.

9. The apparatus of claim 8 further comprising
   a normalizing means coupled to said latching means for normalizing said binary number if said binary number is not normalized, by shifting said bits representing said mantissa and adjusting an exponent of said number in response to said shifting.

10. The apparatus of claim 9, wherein said binary number comprises 68 bits.

11. The apparatus of claim 10, wherein said rounding mode includes one of chop, round up, round down, and round to nearest/even.

12. The apparatus of claim 11, wherein said selecting means generates said rounding bit according to three bits of said mantissa to the right of said least significant bits.

13. In a microprocessor, a method of rounding a binary number having a characteristic bit and a plurality of mantissa bits, said method comprising the steps of:
   inputting a precision which designates one of said plurality of mantissa bits as being a least significant bit;
   latching said binary number;
   clearing each bit of said plurality of mantissa bits to the right of said least significant bit to produce a rounded-down number;
   setting each bit of said plurality of mantissa bits to the right of said least significant bit and incrementing said mantissa to produce a rounded-up number;
   determining whether said binary number is to be rounded up or rounded down;
   selecting said rounded-down number for output if it is determined that said binary number is to be rounded-down and selecting said rounded-up number for output if it is determined that said binary number is to be rounded up, wherein said clearing, setting, and determining steps are processed in parallel in order to minimize a number of clock cycles for rounding said binary number.

14. The method of claim 13, wherein said rounding mode includes one of said chop, round up, round down, and round to nearest/even.

15. The method of claim 14 wherein said precision includes one of single, double, and extended precisions.

16. The method of claim 15, wherein said determining step is performed based on a guard bit, a round bit, and a sticky bit.

17. The method of claim 16, wherein said binary number comprises 68 bits.

* * * * *

UNITED STATES PATENT AND TRADEMARK OFFICE
CERTIFICATE OF CORRECTION

PATENT NO.   : 5,258,943
DATED        : November 2, 1993
INVENTOR(S)  : Gamez et al.

It is certified that error appears in the above-identified patent and that said Letters Patent is hereby corrected as shown below:

In column 6 at line 63 delete " "fmtmt" " and insert --"frnrmt"--

Signed and Sealed this

Thirty-first Day of December, 1996

*Attest:*

BRUCE LEHMAN

*Attesting Officer*      *Commissioner of Patents and Trademarks*